United States Patent
Girnyk (10) Patent No.: US 12,267,130 B2
(45) Date of Patent: Apr. 1, 2025

(54) NETWORK NODE AND METHOD PERFORMED IN A WIRELESS COMMUNICATION NETWORK FOR PRE-CODER OPTIMIZATION

(71) Applicant: Telefonaktiebolaget LM Ericsson (publ), Stockholm (SE)

(72) Inventor: Maksym Girnyk, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 375 days.

(21) Appl. No.: 17/774,034

(22) PCT Filed: Dec. 6, 2019

(86) PCT No.: PCT/SE2019/051247
§ 371 (c)(1),
(2) Date: May 3, 2022

(87) PCT Pub. No.: WO2021/112733
PCT Pub. Date: Jun. 10, 2021

(65) Prior Publication Data
US 2023/0012573 A1    Jan. 19, 2023

(51) Int. Cl.
*H04W 4/00* (2018.01)
*H04B 7/0456* (2017.01)

(52) U.S. Cl.
CPC ................... *H04B 7/0456* (2013.01)

(58) Field of Classification Search
CPC .................... H04B 7/0456; H04B 7/0452
See application file for complete search history.

(56) References Cited

U.S. PATENT DOCUMENTS

| 12,009,888 | B2 * | 6/2024 | Girnyk | G06N 3/08 |
| 2008/0219366 | A1 * | 9/2008 | Lau | H04L 1/0001 375/260 |
| 2008/0219369 | A1 * | 9/2008 | Wu | H04L 1/0002 375/260 |
| 2013/0101008 | A1 * | 4/2013 | Tseng | H04B 7/0452 375/267 |
| 2016/0156383 | A1 * | 6/2016 | Nuzman | H04L 25/0242 375/257 |
| 2020/0366404 | A1 * | 11/2020 | Jang | H04L 1/0057 |

(Continued)

FOREIGN PATENT DOCUMENTS

EP    2525508 A1    11/2012

OTHER PUBLICATIONS

International Search Report and Written Opinion dated Oct. 16, 2020 for International Application No. PCT/SE2019/051247 filed Dec. 6, 2019, consisting of 12-pages.

(Continued)

*Primary Examiner* — Abdelnabi O Musa
(74) *Attorney, Agent, or Firm* — Weisberg I.P. Law, P.A.

(57) ABSTRACT

Embodiments herein disclose a method performed by a network node for handling communication in a wireless communication network. The network node selects a precoder based on mutual information related to channel capacity of a channel, wherein the mutual information is computed in a closed-form computation within a set interval. The network node transmits data over the channel using the selected precoder.

14 Claims, 9 Drawing Sheets

(56) References Cited

U.S. PATENT DOCUMENTS

2023/0035971 A1* 2/2023 Girnyk ............... G06N 3/08

OTHER PUBLICATIONS

N.S. Perovic et al.; Optimization of the Cut-Off Rate of Generalized Spatial Modulation with Transmit Precoding; IEEE Transactions on Communications, vol. 66, No. 10; Oct. 2018, consisting of 18-pages.
Shang Li et al.; Characterizing the Mutual Information Distribution of MIMO Systems: Beyond the Gaussian Approximation; 2012 Conference Record of the Forty Sixth Asilomar Conference on Signals, Systems and Computers (Asilomar), 2012, consisting of 5-pages.
A.A. Farid et al.; Upper and Lower Bounds on the Capacity of Wireless Optical Intensity Channels; 2007 IEEE International Symposium on Information Theory, Jun. 24-29, 2007, consisting of 6-pages.
C. Xiao et al.; Globally Optimal Linear Precoders for Finite Alphabet Signals Over Complex Vector Gaussian Channels; IEEE Transactions on Signal Processing vol. 59, No. 7; Jul. 2011, consisting of 14-pages.
3GPP TS 38.300 V15.2.0; 3rd Generation Partnership Project; Technical Specification Group Radio Access Network; NR; NR and NG-RAN Overall Description; Stage 2 (Release 15); Jun. 2018, consisting of 87-pages.
EPO Communication with Supplementary European Search Report dated Jul. 18, 2023 for Patent Application No. 19954878.5, consisting of 8-pages.
M. Wang et al.; A Low Complexity Algorithm for Linear Precoder Design with Finite Alphabet Inputs; 2012 IEEE Military Communications Conference; IEEE; Oct. 29, 2012, consisting of 5-pages.

* cited by examiner

NETWORK NODE AND METHOD PERFORMED IN A WIRELESS COMMUNICATION NETWORK FOR PRE-CODER OPTIMIZATION

CROSS-REFERENCE TO RELATED APPLICATIONS

This application is a Submission Under 35 U.S.C. § 371 for U.S. National Stage Patent Application of International Application Number: PCT/SE2019/051247, filed Dec. 6, 2019 entitled "NETWORK NODE AND METHOD PERFORMED IN A WIRELESS COMMUNICATION NETWORK FOR PRE-CODER OPTIMIZATION," the entirety of which is incorporated herein by reference.

TECHNICAL FIELD

Embodiments herein relate to a network node and method performed therein regarding communication in a wireless communication network. Furthermore, a computer program product and a computer-readable storage medium are also provided herein. Especially, embodiments herein relate to handling or enabling communication, e.g. receiving or transmitting data over a channel, in the wireless communication network.

BACKGROUND

In a typical wireless communication network, User Equipment (UE), also known as wireless communication devices, mobile stations, stations (STA) and/or wireless devices, communicate via a Radio Access Network (RAN) to one or more core networks (CN). The RAN covers a geographical area which is divided into service areas or cell areas, with each service area or cell area being served by a radio network node such as an access node e.g. a Wi-Fi access point or a radio base station (RBS), which in some radio access technologies (RAT) may also be called, for example, a NodeB, an evolved NodeB (eNodeB) and a gNodeB (gNB). The service area or cell area is a geographical area where radio coverage is provided by the radio network node. The radio network node operates on radio frequencies to communicate over an air interface with the wireless devices within range of the access node. The radio network node communicates over a downlink (DL) to the wireless device and the wireless device communicates over an uplink (UL) to the access node. The radio network node may be a distributed node comprising a remote radio unit and a separated baseband unit.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and UTRAN specifically, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3$^{rd}$ Generation Partnership Project (3GPP) and this work continues in the coming 3GPP releases, such as 4G and 5G networks. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies also known as new radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO).

Increased communication data rates are an inherent requirement for enabling the 5G-connected world. Multiple-antenna technology is of great help for achieving this goal, providing the opportunities to focus the energy in narrow beams, spatially multiplex data streams or providing robustifying diversity. Multi-antenna deployments and techniques constitute a core part of the 5G NR standard.

Figure 1:
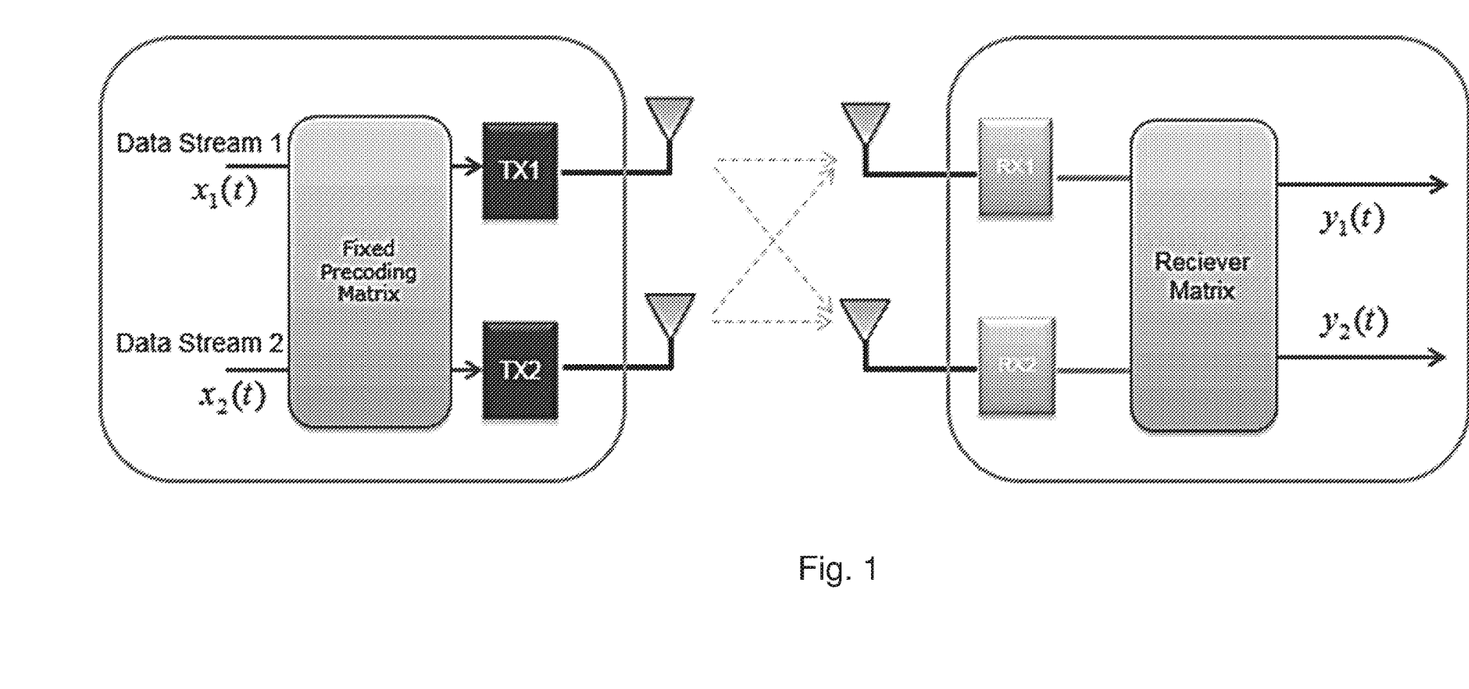
FIG. 1 is a schematic overview depicting a network node according to prior art.

A multi-antenna communication system is described as a so-called MIMO communication channel, see FIG. 1.

The NR standard is based on orthogonal frequency-division multiplexing (OFDM) in the downlink, and discrete Fourier transform (DFT)-precoded OFDM in the uplink, and hence for a given time and/or frequency resource element the received vector y of size N×1 is modeled by $$y = HGx + n,$$

where H is the N×M matrix describing the channel coefficients, n is the N×1 vector of noise/interference observed at the receiver and x is the transmitted symbol vector of size M×1.

Matrix G is the so-called precoder or precoder matrix that adjusts the transmission to the radio environment, and can be either wideband or frequency-selective. In the frequency division duplex (FDD) case, the precoder matrix is selected from a codebook of possible precoder matrices and is typically indicated by means of a precoder matrix indicator (PMI), which specifies a unique precoder matrix in the codebook for a given number of symbol streams. This strategy allows the transmitter to adjust the precoder without explicit knowledge of the channel state information (CSI), as the latter is usually unavailable in the FDD operation mode. In time division duplex (TDD) systems, however, there is a possibility to obtain the explicit CSI via channel reciprocity. That is, uplink sounding reference signals (SRS) are sent by the UE to estimate the downlink channel matrix H. Having such an estimate, the transmitter at the radio network node can then optimize the precoder matrix G.

In practical multi-antenna systems, the optimization is done by means of a singular-value decomposition (SVD) based solution that exploits the eigenvectors of the channel matrix H. The rationale of such an approach is based on the formula for the maximum theoretically achievable data rate of a single-user MIMO channel. The latter is given by Shannon's channel capacity C, i.e., $$C = \log \det(I_N + HGG^H H^H),$$

where G is the optimum precoder matrix that is typically obtained by the right singular vectors of the channel matrix (obtained by its SVD) alongside water filling over the inverse of the channel eigenvalues. Note that to have the rate in bits/s/Hz the logarithm is taken with base 2.

Notwithstanding, the above solution is not optimal as it adjusts the precoder matrix to maximize the capacity of the channel. The latter is, however, never achieved in practice (except for the very low-SNR operation region) since it is based on the assumption of purely information-theoretical random Gaussian signaling. In practice, communication systems are operating with finite-alphabet signal constellations, such as, e.g., quadrature phase shift keying (QPSK), 8-phase shift keying (PSK), 16-quadrature amplitude modulation (QAM). The truly optimal solution should, therefore, rely on an expression of the actual achievable data rate instead.

The achievable data rate, e.g. in bits/s/Hz, for finite-alphabet signals is given by the constellation-constrained mutual information between y and x $$I(y; x|H, G) = \qquad \qquad \qquad \qquad \qquad \qquad \qquad \#(1)$$

$$M \log|S| - \frac{1}{|S|^M} \sum_{m=1}^{|S|^M} \mathbb{E}_n \left\{ \log \sum_{k=1}^{|S|^M} \exp\left(-\|HG(x_m - x_k) + n\|^2 - \|n\|^2\right) \right\},$$

where $\mathcal{S}$ represents the set of all points of the given signal constellation, and $\mathbb{E}_n\{\cdot\}$ stands for the expectation with respect to the distribution of the received noise vector n.

Being able to compute the expression for the achievable rate, one can formulate the optimization problem as follows $$\begin{array}{c} \text{maximize} \\ G \\ \text{subject to} \end{array} \quad I(y; x|H, G) \atop \text{power constraint},$$

where the power constraint corresponds to the system operating constraints. For instance, total power constraint is commonly used for the precoder optimization, that is $$tr\{G^H G\} \leq M.$$

The solution to the optimization problem above is obtained by the precoder-optimization algorithm proposed in (Xiao et al, 2011) which is sketched below ---
Algorithm #1. Iterative precoder-optimization algorithm Xiao et al, 2011.
---

Step 1: For a given channel H, apply singular value decomposition (SVD) to decompose $H = U_H \Sigma_H V_H$ and convert the original channel model (1) into its equivalent model (43), where x is drawn from a pre-chosen finite alphabet set (constellation).

Step 2: Choose an initial set of non-zero values for $\omega_{pq}$, $\upsilon_{pg}$ and non-negative diagonal matrix $\Sigma_G$ with trace($\Sigma_G^2$) = $N_t$. Choose a unitary diagonal matrix D, which does not affect the maximization of mutual information $\mathcal{I}$ (x; ȳ).

Step 3: Compute mutual information $\mathcal{I}$ (x; ȳ) and MMSE matrix Φ. Use backtracking line search [29] to determine a step size $\mu_\Theta$ to obtain the incremental δW before solving for $\delta\omega_{pq}$ and $\delta\upsilon_{pg}$ with fixed $\Sigma_G$. Then update unitary matrix Θ.

Step 4: Update (or re-compute) mutual information $\mathcal{I}$ (x; ȳ) and MMSE matrix Φ according to the updated matrix Θ.

Step 5: Calculate the gradient for $\Sigma_G^2$ as follows:
$$D_G = \text{diag}(\Sigma_H^2 \Theta \Phi \Theta^h) - \lambda I_{Nt} \quad (47)$$
with $\lambda = \dfrac{\text{trace}\left[\text{diag}\left(\sum_H^2 \Theta \Phi \Theta^h\right)\right]}{N_t}$.

Step 6: Update $\Sigma_G^2$ by $\Sigma_G^2 + \mu_\Sigma D_G$ with $\mu_\Sigma$ being a step size, which is determined by the backtracking line search. Set any negative diagonal entry of $\Sigma_G^2$ to zero, before normalizing the updated non-negative $\Sigma_G^2$ to satisfy the power constraint: trace($\Sigma_G^2$) = $N_t$.

Step 7: If the step size $\mu_\Sigma$ in Step 6 has to be (nearly) zero, then update $\Sigma_G^2$ by $\Sigma_G^2 - \mu_\Sigma D_G$ with $\mu_\Sigma$ being determined by the backtracking line search. Set any negative diagonal entry of $\Sigma_G^2$ to zero, then normalize the updated non-negative $\Sigma_G^2$ to satisfy the power constraint: trace($\Sigma_G^2$) = $N_t$.

Repeat Step 3 through Step 7 until convergence or until a pre-set target is reached. Then a globally optimal precoder $G^{opt} = V_H \Sigma_G^{opt} \Theta^{opt}$ is obtained. ◊

---

It can be seen from the above that the optimal solution does not exhibit a closed-form solution. Instead, the algorithm is iterative and is based on alternations between gradient-descent updates of eigenvalues and eigenvectors of the precoder matrix until convergence thus the steps are repeated until convergence.

Note also that for each iteration of the above algorithm one may have to evaluate a gradient of the mutual-information, given by a Minimum mean-squared error (MMSE) matrix, that is computed as $$E = I_M - \frac{1}{|S|^M} \mathbb{E}_n \left\{ \frac{\left(\sum_{m=1}^{|S|^M} \sum_{k=1}^{|S|^M} x_k \exp\left(-\|HG(x_m - x_k) + n\|^2\right)\right)^2}{\sum_{m=1}^{|S|^M} \sum_{k=1}^{|S|^M} \exp\left(-\|HG(x_m - x_k) + n\|^2\right)} \right\}. \quad \#(2)$$

A problem with the prior-art solution is the complexity of the computation of the precoder. It can be seen that the evaluation of the expression for mutual information #(1) requires a huge number of computations for multi-antenna setups even for moderate numbers of antennas. That is, it contains three nested loops:

1. external averaging over the signal points,
2. averaging over the noise realizations in the middle,
3. internal averaging over the signal points.

Unfortunately, the two loops over the signal constellation points exhibit exponential computational complexity with respect to the number of transmit antennas, leading to huge computational times even for moderate numbers of antennas.

For example, let S be a quadrature phase shift keying (QPSK) constellation, whilst assume the transmitter is equipped with M=4 antennas. Even disregarding the averaging over the noise, the required number of evaluations of the inner exponent term becomes $(4^4)^2=65536$. Meanwhile, for a setup with M=8 antennas this number explodes to $(4^8)^2=4.295\times10^9$ computations.

Note that in addition to the computation of mutual information #(1), one has to also evaluate the MMSE matrix #(2). Namely there are three more nested computation loops, which increases the complexity even further.

This all makes conventional precoding optimization infeasible for systems quipped with large antenna arrays, such as massive MIMO.

SUMMARY

An object of embodiments herein is to provide a mechanism that enables communication in the wireless communication network in an efficient manner.

According to an aspect the object is achieved by providing a method performed by a network node for handling communication in a wireless communication network. The network node selects a precoder based on mutual information related to channel capacity of a channel, wherein the mutual information is computed in a closed-form computation within a set interval. The network node further transmits data over the channel using the selected precoder.

According to another aspect the object is achieved by providing a network node for handling communication in a wireless communication network. The network node is configured to select a precoder based on mutual information related to channel capacity of a channel, wherein the mutual information is computed in a closed-form computation within a set interval. The network node is further configured to transmit data over the channel using the selected precoder.

It is furthermore provided herein a computer program product comprising instructions, which, when executed on at least one processor, cause the at least one processor to carry out the method above, as performed by the network node. It is additionally provided herein a computer-readable storage medium, having stored thereon a computer program product comprising instructions which, when executed on at least one processor, cause the at least one processor to carry out the method above, as performed by the network node.

Embodiments herein propose a low-complexity alternative to the prior-art precoder optimization routine. It is based on computationally light approximations to the expressions of mutual information and MMSE matrix. The obtained approximations would be used in the existing iterative precoder-optimization algorithm, which would run significantly faster due to the low complexity of the approximations. Embodiments herein reduce complexity of the precoder optimization, while maintaining near-optimal performance. Thus, the embodiments herein provide an efficient manner of selecting a precoder for enabling communication.

BRIEF DESCRIPTION OF THE DRAWINGS

Embodiments will now be described in more detail in relation to the enclosed drawings, in which.

DETAILED DESCRIPTION

Embodiments herein may be described within the context of 3GPP NR radio technology (3GPP TS 38.300 V15.2.0 (2018-06)), e.g. using gNB as the radio network node. It is understood, that the problems and solutions described herein are equally applicable to wireless access networks and UEs implementing other access technologies and standards. NR is used as an example technology where embodiments are suitable, and using NR in the description therefore is particularly useful for understanding the problem and solutions solving the problem. In particular, embodiments are applicable also to 3GPP LTE, or 3GPP LTE and NR integration, also denoted as non-standalone NR.

Figure 2:
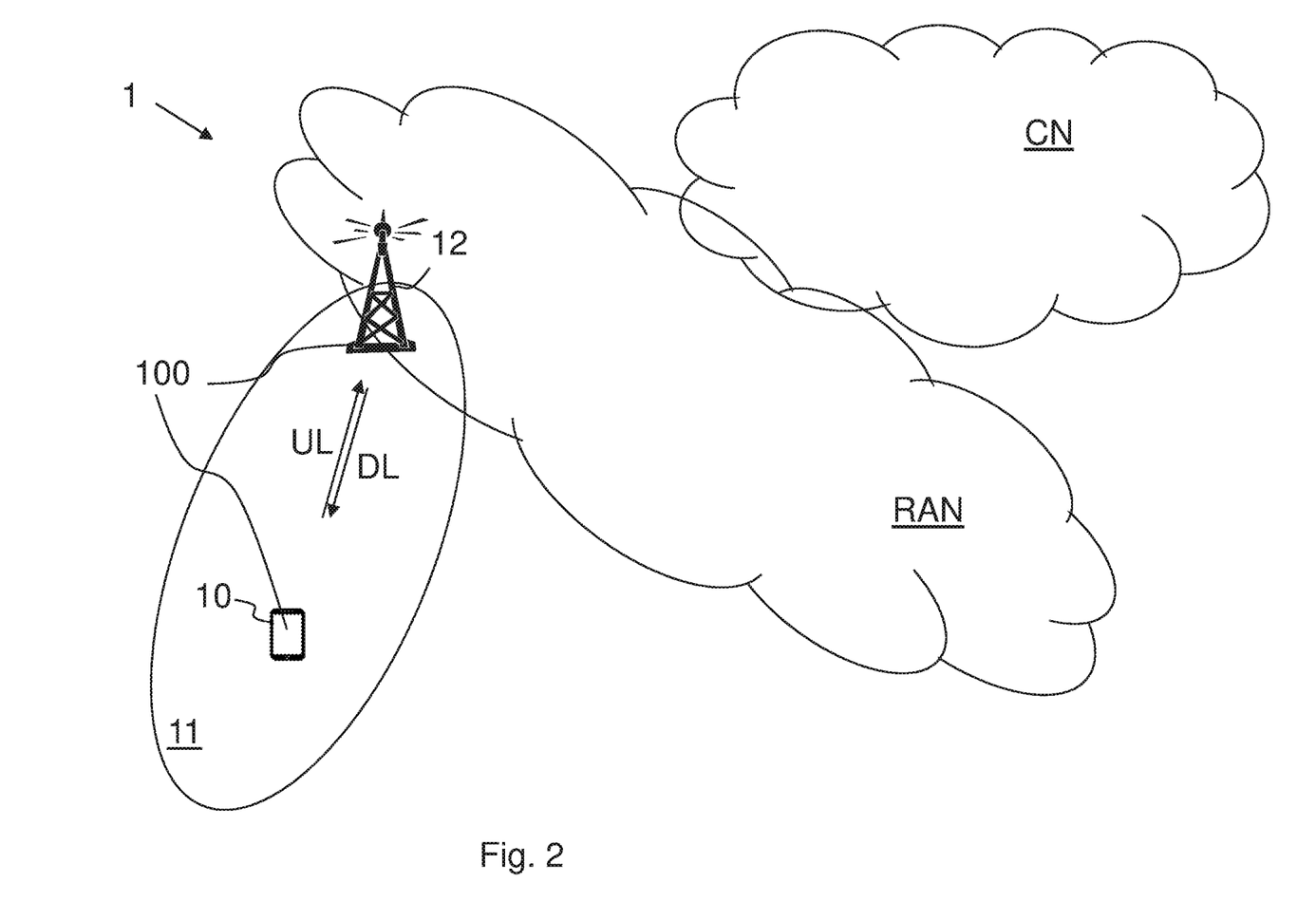
FIG. 2 is a schematic overview depicting a wireless communication network according to embodiments herein.

Embodiments herein relate to wireless communication networks in general. FIG. 2 is a schematic overview depicting a wireless communication network 1. The wireless communication network 1 comprises e.g. one or more RANs and one or more CNs. The wireless communication network 1 may use one or a number of different technologies, such as Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in 5G systems, however, embodiments are also applicable in further development of the existing communication systems such as e.g. a 5G, WCDMA and LTE.

In the wireless communication network 1, wireless devices e.g. a UE 10 such as a mobile station, a non-access point (non-AP) STA, a STA, a user equipment and/or a wireless terminal, communicate via one or more Access Networks (AN), e.g. RAN, to one or more CNs. It should be understood by the skilled in the art that "UE" is a non-limiting term which means any terminal, wireless communication terminal, user equipment, Machine Type Communication (MTC) device, Device to Device (D2D) terminal, internet of things (IoT) operable device, or node e.g. smart phone, laptop, mobile phone, sensor, relay, mobile tablets or even a small base station capable of communicating using radio communication with a network node within an area served by the network node.

The communication network 1 comprises a radio network node 12 providing e.g. radio coverage over a geographical area, a service area 11, of a radio access technology (RAT), such as NR, LTE, Wi-Fi, WiMAX or similar. The radio network node 12 may be a transmission and reception point, a computational server, a base station e.g. a network node such as a satellite, a Wireless Local Area Network (WLAN) access point or an Access Point Station (AP STA), an access node, an access controller, a radio base station such as a NodeB, an evolved Node B (eNB, eNodeB), a gNodeB (gNB), a base transceiver station, a baseband unit, an Access Point Base Station, a base station router, a transmission arrangement of a radio base station, a stand-alone access point or any other network unit or node depending e.g. on the radio access technology and terminology used. The radio network node 12 may alternatively or additionally be a controller node or a packet processing node such or similar. The radio network node 12 may be referred to as a serving network node wherein the service area 11 may be referred to as a serving cell or primary cell, and the serving network node communicates with the UE 10 in form of DL transmissions to the UE 10 and UL transmissions from the UE 10. The radio network node may be a distributed node comprising a baseband unit and one or more remote radio units. The UE 10 and/or the radio network node 12 are herein referred to as a network node 100.

The method according to embodiments herein is performed by the network node 100. As an alternative, a distributed node and functionality, e.g. comprised in a cloud, may be used for performing or partly performing the method.

It should be noted that a service area may be denoted as cell, beam, beam group or similar to define an area of radio coverage.

Embodiments herein propose a low-complexity alternative to the prior-art precoder optimization routine at the network node 100. That is, an accurate efficient manner of selecting precoder for transmission of data is herein provided. The selection is based on computationally light approximations to the expressions of mutual information and MMSE matrix. The obtained approximations would be used in the existing iterative precoder-optimization algorithm, which would run significantly faster due to the low complexity of the approximations. Embodiments herein reduce complexity of the precoder optimization, while maintaining near-optimal performance. Mutual information may be defined as achievable communication rate e.g. bits/channel use. In information-theoretic terms, it is computed as the "mutual information" I(y; x|H, G) between the distributions of input x and output y vectors (in the MIMO case) of the communication channel given by y=HGx+n. Of course, as one sees, there is conditionality in the expression on H, G. That is, this mutual information is conditioned on the given channel matrix H and precoder G. By choosing the best G we can maximize the achievable rate R=I(y; x|H, G).

By exploiting some light approximations for the mutual information, one can speed-up the computation of the optimal precoder.

The transmitter can apply the low-complexity capped Gaussian approximation of the mutual information $$I(y;x|H,G) \approx \min\{\log \det(I_N + HGG^H H^H), M \log|\mathcal{S}|\}.$$

At the same time, to simplify the computation of the mutual-information gradient, one can use the Gaussian-signaling expression for the MMSE matrix, given by $$E = (I_M + GHH^H G^H)^{-1}.$$

Then, the above expressions of mutual information and MMSE matrix may be used in the optimization algorithm, e.g. algorithm #1, to iteratively update eigenvalues and eigenvectors of the precoder. In this way, the computation of the (approximately) optimal precoder becomes significantly lighter.

Figure 3:
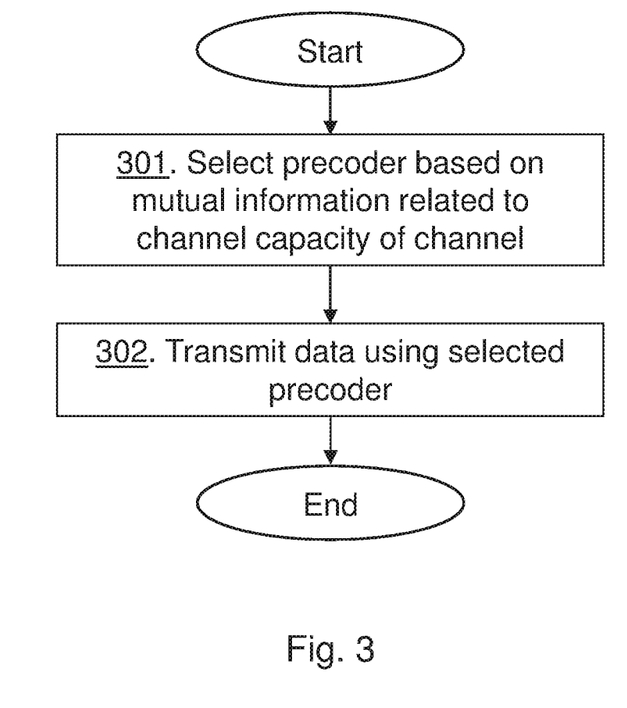
FIG. 3 is a flowchart depicting a method performed by a network node according to embodiments herein.

The method actions performed by the network node 100 for handling communication in a wireless communication network according to embodiments herein will now be described with reference to a flowchart depicted in FIG. 3. The actions do not have to be taken in the order stated below, but may be taken in any suitable order. Actions performed in some embodiments are marked with dashed boxes.

Action 301. The network node 100 selects a precoder based on mutual information related to channel capacity of a channel, wherein the mutual information is computed in a closed-form computation within a set interval. The set interval may be related to an upper bound of data rate of the channel, the upper bound may be based on Maximum entropy of a finite-alphabet information source. It may be given by $M \log|\mathcal{S}|$. The mutual information may be a capped Gaussian-signal approximation, e.g., an approximation based on the assumption of utilization of Gaussian signals. The precoder may further be selected based on a mutual information gradient of a closed-form computation. The mutual information gradient may comprise a Gaussian-signal approximation. The network node may select the precoder by selecting a precoder matrix.

For example, at each iteration of Algorithm #1, instead of computing the true mutual information gradient or MMSE matrix $$E = I_M - \frac{1}{|\mathcal{S}|^M} \mathbb{E}_n \left\{ \frac{\left(\sum_{m=1}^{|\mathcal{S}|^M} \sum_{k=1}^{|\mathcal{S}|^M} x_k \exp(-\|HG(x_m - x_k) + n\|^2)\right)^2}{\sum_{m=1}^{|\mathcal{S}|^M} \sum_{k=1}^{|\mathcal{S}|^M} \exp(-\|HG(x_m - x_k) + n\|^2)} \right\}$$

(with a lot of numerical averaging) a simplified Gaussian-signal based approximation is computed:

$$E = (I_M + GHH^H G^H)^{-1}.$$

The latter is clearly much easier to compute since it exhibits a simple closed-form expression.

The selection may be performed for a given channel constellation. The network node 100 may select the precoder for a given signal constellation such as quadrature amplitude modulation (QAM) or quadrature phase shift keyed (QPSK). The constellation affects the mutual information $$I(y; x|H, G) =$$

$$M\log|\mathcal{S}| - \frac{1}{|\mathcal{S}|^M} \sum_{m=1}^{|\mathcal{S}|^M} \mathbb{E}_n \left\{ \log \sum_{k=1}^{|\mathcal{S}|^M} \exp(-\|HG(x_m - x_k) + n\|^2 - \|n\|^2) \right\},$$

where $\mathcal{S}$ is the constellation set. For a given $\mathcal{S}$ there is a certain value of I(y; x|H, G). Hence, optimal precoder for a QPSK constellation may not be optimal for a 64-QAM constellation, etc.

Action 302. The network node 100 transmits data over the channel using the selected precoder.

Thus, a MIMO channel exists, described by y=Hs+n, where s is the vector that we actually transmit from the transmitter antennas. When computed G, we transmit s=Gx, hence the actual channel input-output relationship becomes y=HGx+n. By choosing the best G we can maximize the achievable rate R=I(y; x|H, G).

Figure 4:
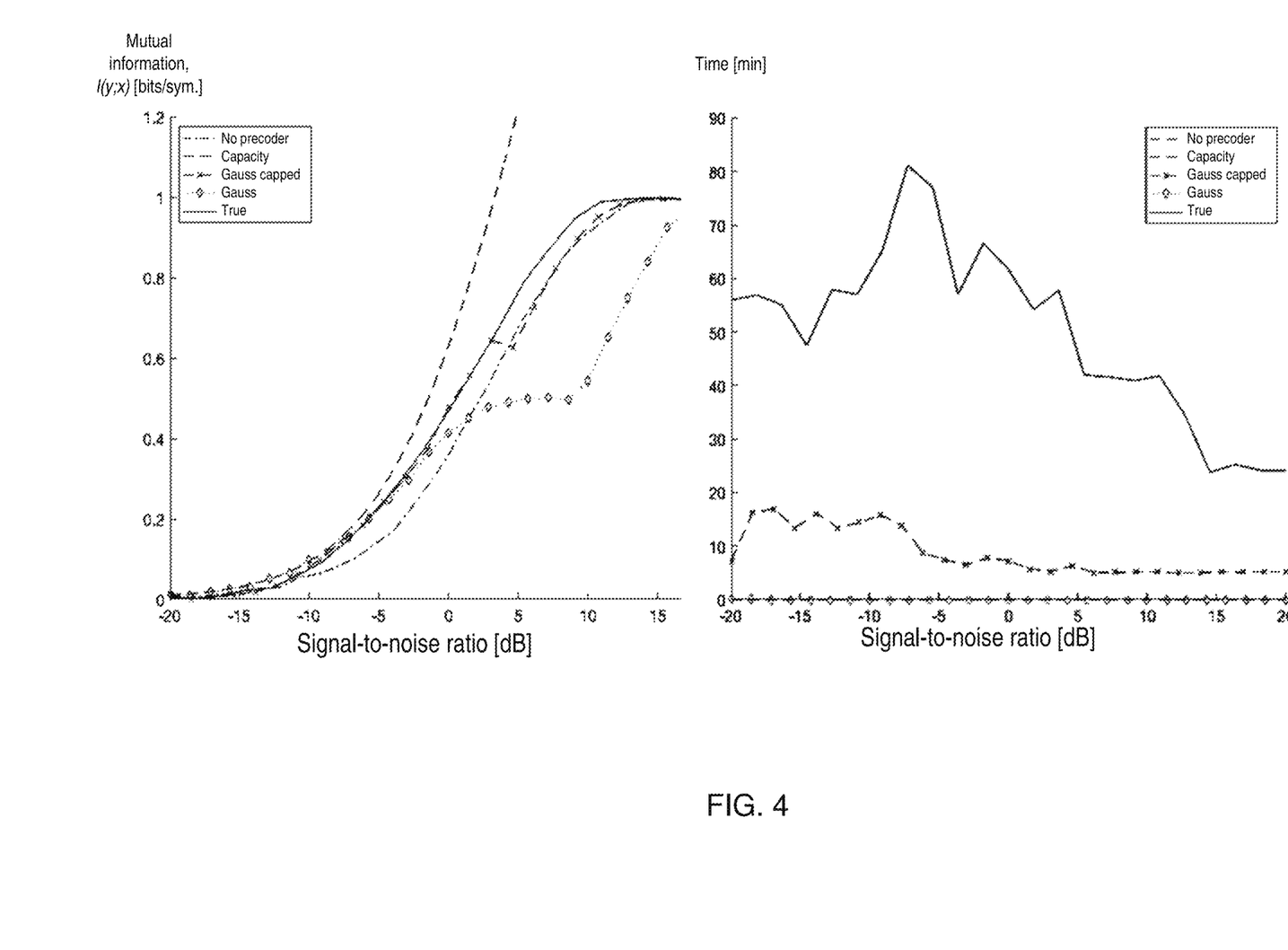
FIG. 4 are diagrams depicting signal strength of using embodiments herein compared to true results.

To illustrate the performance, an optimization algorithm is executed using the above approximation to get the figures below. Here a 2×2 single user Multiple Input Multiple Output SU-MIMO system with Binary PSK (BPSK) signaling is simulated (i.e., $x_m \in \{\pm 1\}$). The channel is modeled as in e.g. Rayleigh fading, and a particular realization of the channel matrix for this example was picked as $$H = \begin{bmatrix} 0.1619 - 1.7154j & 0.2479 + 0.2345j \\ -0.3985 - 0.9047j & -0.2317 + 0.6240j \end{bmatrix}.$$

FIG. 4 illustrates that the performance of the proposed low-complexity solution based on the Gaussian capped approximation for mutual information $$I(y;x|H,G) \approx \min\{\log \det(I_N + HGG^H H^H), M \log|S|\};$$

and Gaussian approximation for the MMSE matrix $$E = (I_M + GHH^H G^H)^{-1}.$$

It can be seen that the performance of the proposed solution is close-to-optimal, while the execution is very fast. Note the poor performance of the conventional "optimal" SVD-based solution is when it comes to finite-alphabet signaling. At the same time, note the huge gains in execution time as compared to the actual optimal precoder.

FIG. 4 shows achievable data rates (left) and execution time (right) as functions of SNR for a 2×2 MIMO system with BPSK signaling. Black dashed line indicates the theoretical channel capacity, dotted and dot-dashed lines indicate the performance of SVD-based precoding (Gauss), and no precoding at all, dark solid line indicates the performance of the truly optimal precoder, grey dashed line with x-markers indicates that of the proposed low-complexity solution.

It is seen that the precoders optimized with help of various approximations perform very closely, e.g. on a 2×2 MIMO channel with QPSK modulation. Meanwhile, the time necessary to compute the precoders vary substantially (see right figure). When comparing to the performance of the truly optimal precoder (true expression for the mutual information with 3 nested loops) depicted with black solid line, it is seen that the approximations allow us to reduce computation time 10 times or more! Meanwhile, the performance in terms of achievable data rate remains very similar.

Figure 5:
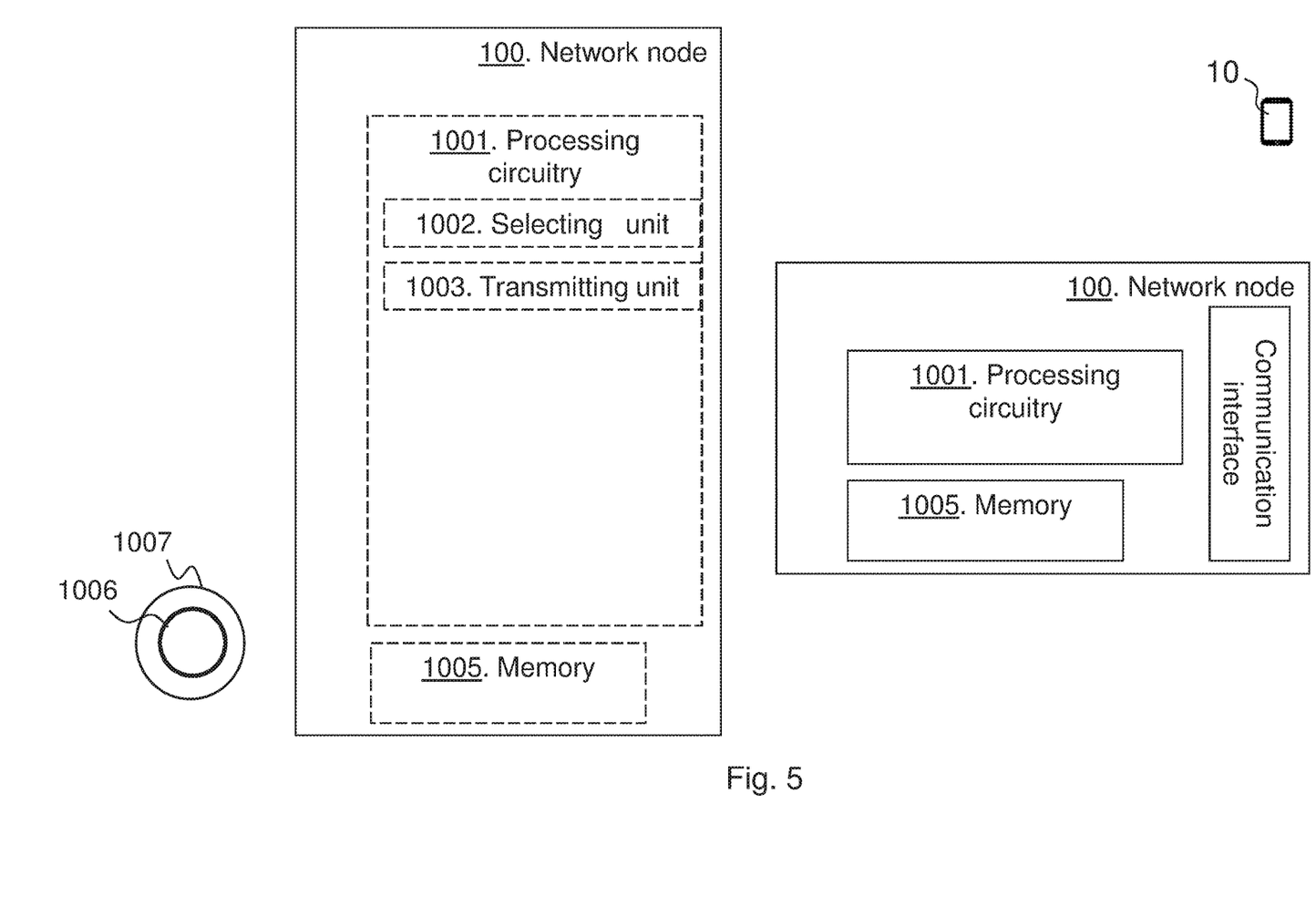
FIG. 5 is a block diagram depicting a network node according to embodiments herein.

FIG. 5 is a block diagram depicting the network node 100, such as the radio network node 12 or the UE 10, for handling communication, e.g. enabling communication such as a selecting precoder, in the wireless communication network 1 according to embodiments herein.

The network node 100 may comprise processing circuitry 1001, e.g. one or more processors, configured to perform the methods herein.

The network node 100 may comprise a selecting unit 1002. The network node 100, the processing circuitry 1001 and/or the selecting unit 1002 is configured to select the precoder based on mutual information related to channel capacity of the channel, wherein the mutual information is computed in a closed-form computation within the set interval. The set interval may be related to the upper bound of data rate of the channel. The mutual information may be the capped Gaussian-signal approximation. The network node 100, the processing circuitry 1001 and/or the selecting unit 1002 may be configured to select the precoder based further on a mutual information gradient of a closed form computation. The mutual information gradient may comprise the Gaussian-signal approximation. The network node 100, the processing circuitry 1001 and/or the selecting unit 1002 may be configured to select the precoder by selecting a precoder matrix. The network node 100, the processing circuitry 1001 and/or the selecting unit 1002 may be configured to select the precoder for a given channel constellation.

The network node 100 may comprise a transmitting unit 1003, e.g. a transmitter or a transceiver. The network node 100, the processing circuitry 1001 and/or the transmitting unit 1003 is configured to transmit data over the channel using the selected precoder.

The network node 100 further comprises a memory 1005. The memory comprises one or more units to be used to store data on, such as indications, strengths or qualities, grants, precoders, index of precoders, applications to perform the methods disclosed herein when being executed, and similar. The network node 100 comprises a communication interface comprising transmitter, receiver, transceiver and/or one or more antennas.

The methods according to the embodiments described herein for the network node 100 are respectively implemented by means of e.g. a computer program product 1006 or a computer program product, comprising instructions, i.e., software code portions, which, when executed on at least one processor, cause the at least one processor to carry out the actions described herein, as performed by the network node 100. The computer program product 1006 may be stored on a computer-readable storage medium 1007, e.g. a USB stick, a disc or similar. The computer-readable storage medium 1007, having stored thereon the computer program product, may comprise the instructions which, when executed on at least one processor, cause the at least one processor to carry out the actions described herein, as performed by the network node 100. In some embodiments, the computer-readable storage medium may be a non-transitory or transitory computer-readable storage medium.

In some embodiments a more general term "radio network node" is used and it can correspond to any type of radio network node or any network node, which communicates with a wireless device and/or with another network node. Examples of network nodes are NodeB, Master eNB, Secondary eNB, a network node belonging to Master cell group (MCG) or Secondary Cell Group (SCG), base station (BS), multi-standard radio (MSR) radio node such as MSR BS, eNodeB, network controller, radio network controller (RNC), base station controller (BSC), relay, donor node controlling relay, base transceiver station (BTS), access point (AP), transmission points, transmission nodes, Remote Radio Unit (RRU), Remote Radio Head (RRH), nodes in distributed antenna system (DAS), core network node e.g. Mobility Switching Centre (MSC), Mobile Management Entity (MME) etc., Operation and Maintenance (O&M), Operation Support System (OSS), Self-Organizing Network (SON), positioning node e.g. Evolved Serving Mobile Location Centre (E-SMLC), Minimizing Drive Test (MDT) etc.

In some embodiments the non-limiting term wireless device or user equipment (UE) is used and it refers to any type of wireless device communicating with a network node and/or with another UE in a cellular or mobile communication system. Examples of UE are target device, device-to-device (D2D) UE, proximity capable UE (aka ProSe UE), machine type UE or UE capable of machine to machine (M2M) communication, PDA, PAD, Tablet, mobile terminals, smart phone, laptop embedded equipped (LEE), laptop mounted equipment (LME), USB dongles etc.

The embodiments are described for 5G. However the embodiments are applicable to any RAT or multi-RAT systems, where the UE receives and/or transmit signals (e.g. data) e.g. LTE, LTE FDD/TDD, WCDMA/HSPA, GSM/GERAN, Wi Fi, WLAN, CDMA2000 etc.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications devices will appreciate the cost, performance, and maintenance trade-offs inherent in these design choices.

Figure 6:
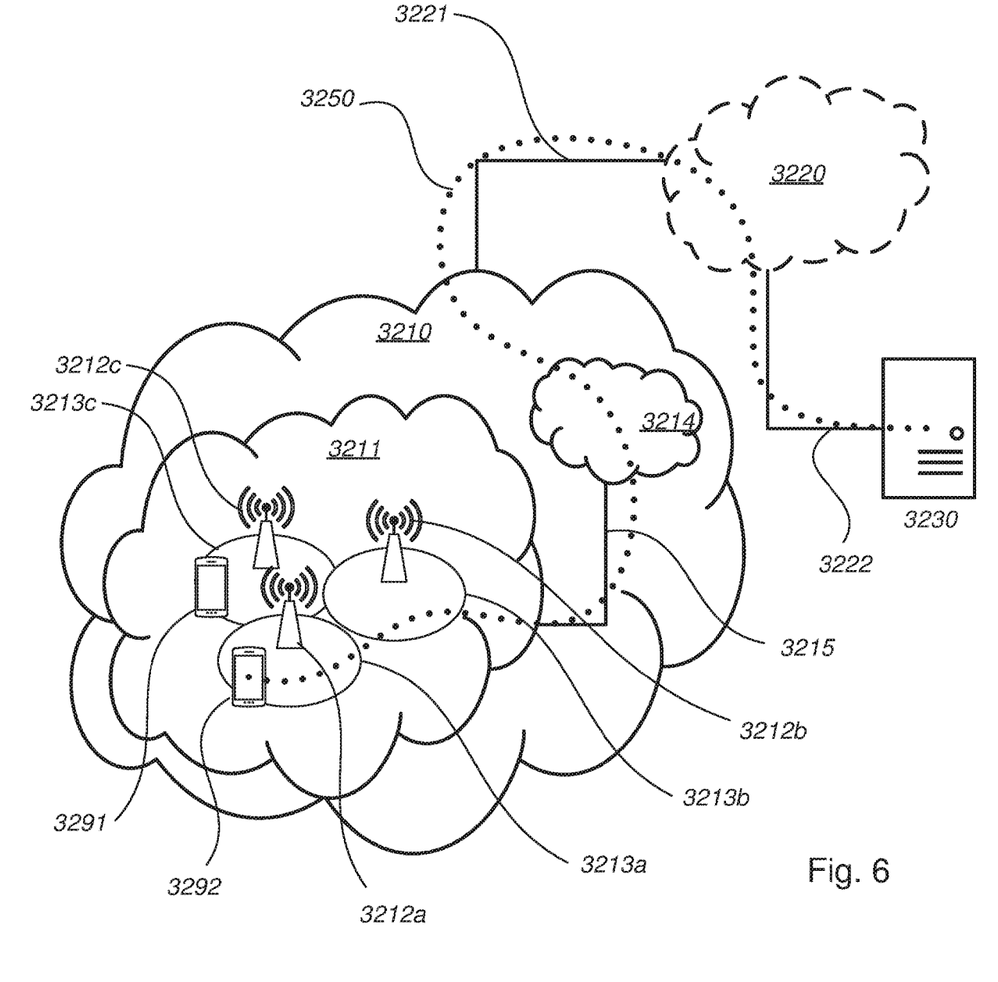
FIG. 6 schematically illustrates a telecommunication network connected via an intermediate network to a host computer.

With reference to FIG. 6, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 6 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 7. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 7) served by the base station 3320. The communication interface 3326 may be configured to facilitate a connection 3360 to the host computer 3310. The connection 3360 may be direct or it may pass through a core network (not shown in FIG. 7) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 7:
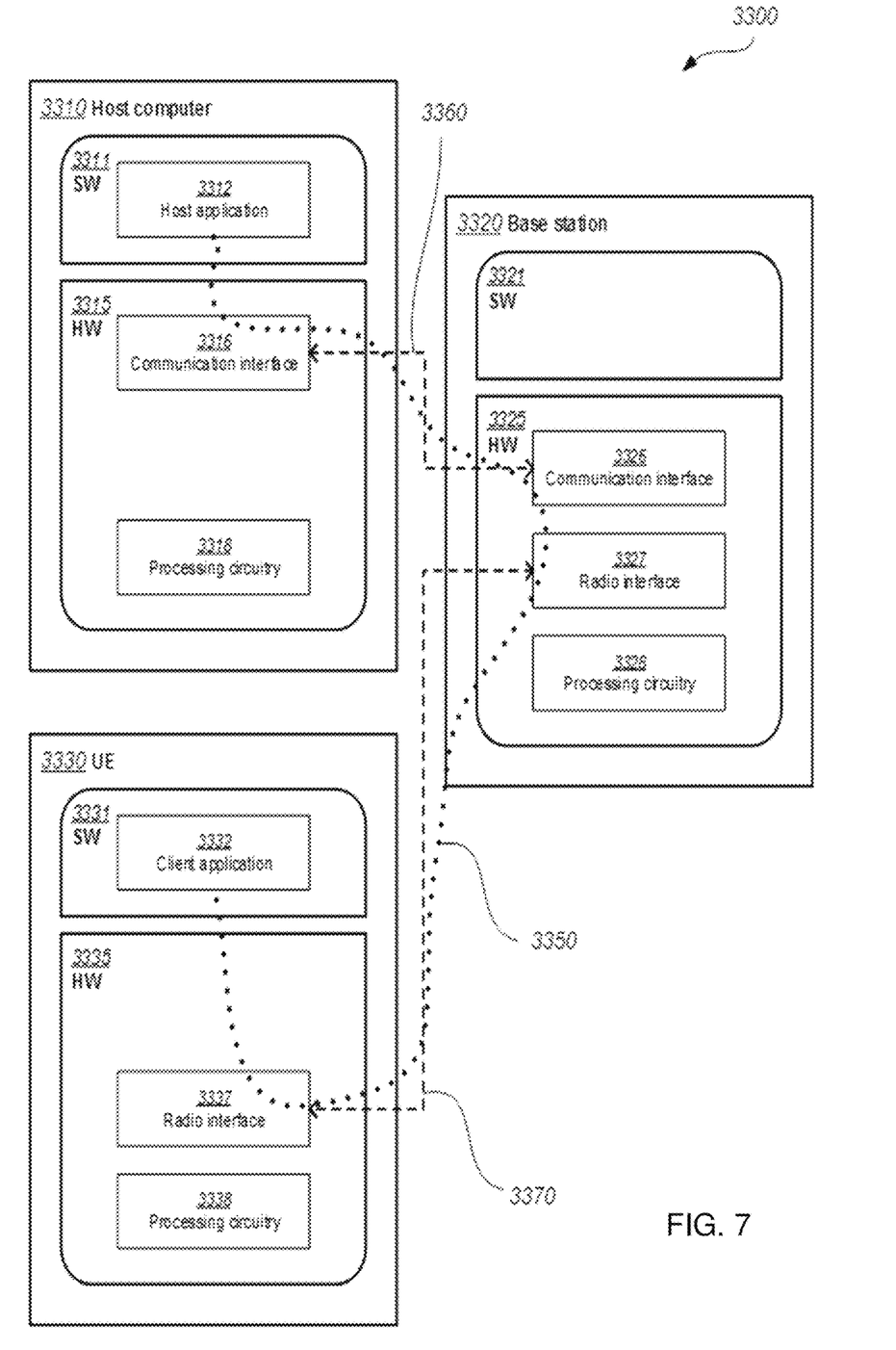
FIG. 7 is a generalized block diagram of a host computer communicating via a base station with a user equipment over a partially wireless connection.

It is noted that the host computer 3310, base station 3320 and UE 3330 illustrated in FIG. 7 may be identical to the host computer 3230, one of the base stations 3212a, 3212b, 3212c and one of the UEs 3291, 3292 of FIG. 6, respectively. This is to say, the inner workings of these entities may be as shown in FIG. 7 and independently, the surrounding network topology may be that of FIG. 6.

In FIG. 7, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may select precoder in a more efficient manner and may improve the energy consumption of the UE or the radio network node and thereby provide benefits such as improved battery time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 8:
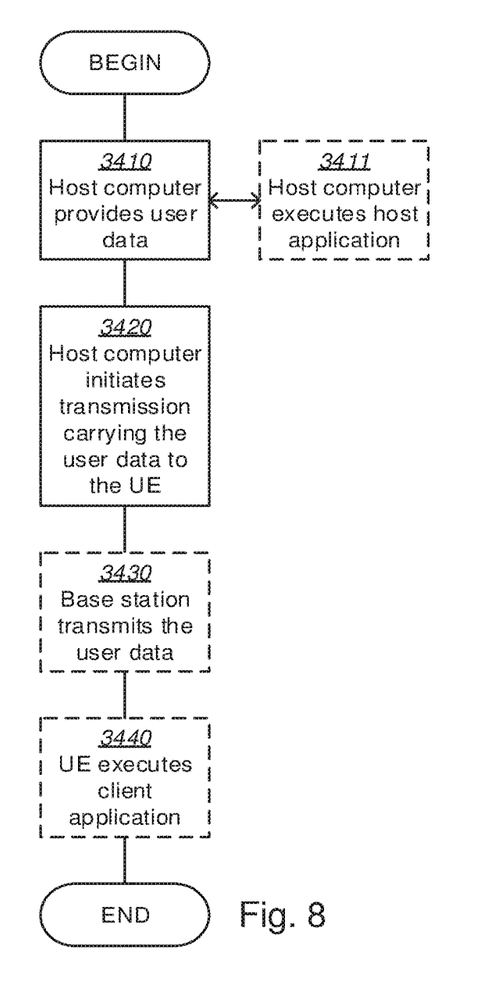
FIGS. 8-11 are flowcharts illustrating methods implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 9:
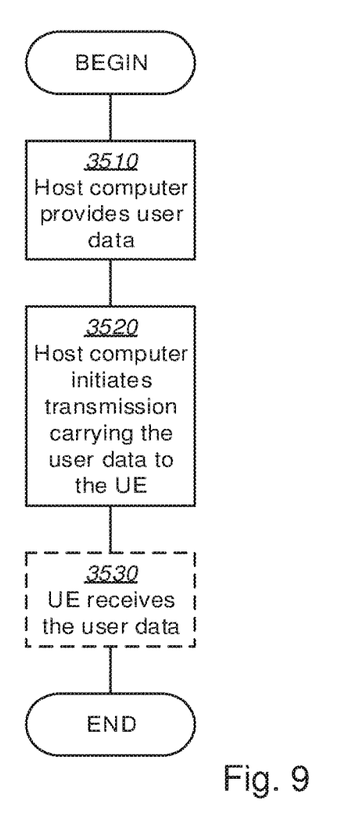

FIG. 9 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 9 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 10, 11:
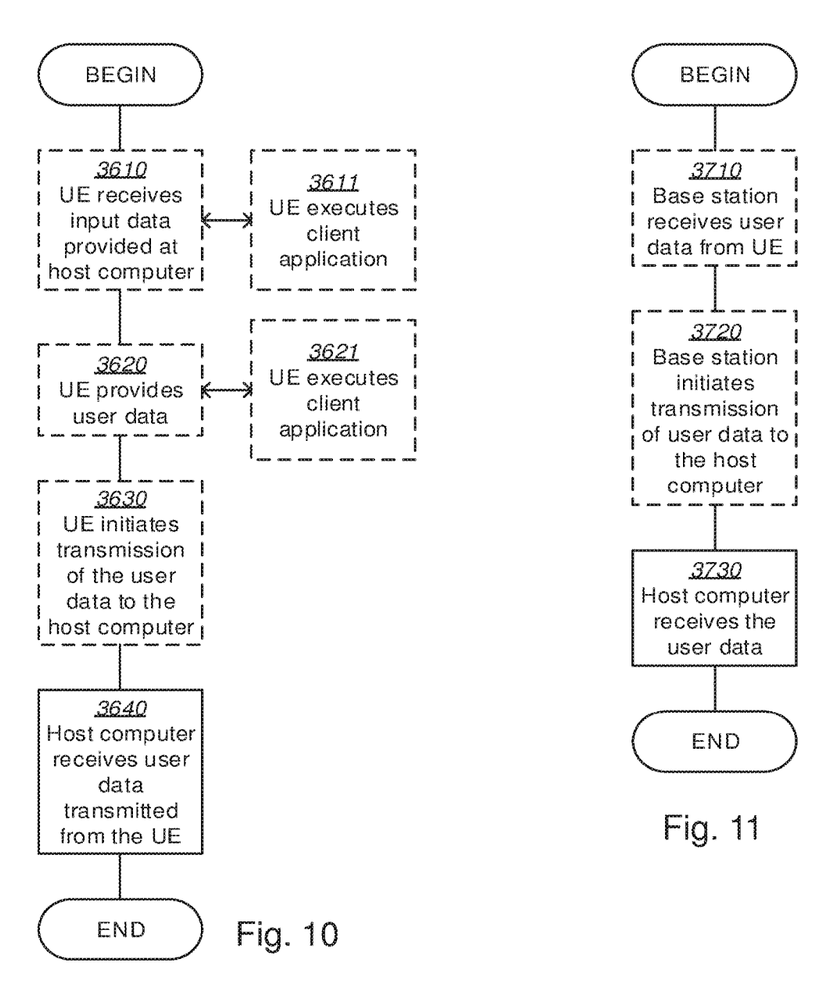

FIG. 10 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 10 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

ABBREVIATIONS

CSI Channel state information
FDD Frequency division duplex
MIMO Multiple-input multiple-output
ML Machine learning
MMSE Minimum mean-squared error
PSK Phase shift keying
QAM Quadrature amplitude modulation
TDD Time division duplex
SNR Signal-to-noise ratio
ISRS Sounding reference signal
SVD Singular value decomposition
SU Single user

The invention claimed is:

1. A method performed by a network node for handling communication in a wireless communication network, the method comprising:
selecting a precoder based on mutual information related to channel capacity of a channel, the mutual information being computed in a closed-form computation within a set interval, selecting the precoder being further based on a mutual information gradient of a closed form computation, the mutual information gradient comprising a Gaussian-signal approximation; and transmitting data over the channel using the selected precoder.

2. The method according to claim 1, wherein the set interval is related to an upper bound of data rate of the channel.

3. The method according to claim 2, wherein the mutual information is a capped Gaussian-signal approximation.

4. The method according to claim 2, wherein selecting precoder comprises selecting a precoder matrix.

5. The method according to claim 2, wherein the selection is performed for a given channel constellation.

6. The method according to claim 1, wherein the mutual information is a capped Gaussian-signal approximation.

7. The method according to claim 1, wherein selecting precoder comprises selecting a precoder matrix.

8. The method according to claim 1, wherein the selection is performed for a given channel constellation.

9. A network node for handling communication in a wireless communication network, the network node comprising a processor and memory storing a plurality of instructions that, when executed by the processor, cause the processor to:
select a precoder based on mutual information related to channel capacity of a channel, the mutual information being computed in a closed-form computation within a set interval, selecting the precoder being further based further on a mutual information gradient of a closed form computation, the mutual information gradient comprising a Gaussian-signal approximation; and transmit data over the channel using the selected precoder.

10. The network node according to claim 9, wherein the set interval is related to an upper bound of data rate of the channel.

11. The network node according to claim 9, wherein the mutual information is a capped Gaussian-signal approximation.

12. The network node according to claim 9, wherein the plurality of instructions is configured to cause the processor to select the precoder by selecting a precoder matrix.

13. The network node according to claim 9, wherein the plurality of instructions is configured to cause the processor to select the precoder for a given channel constellation.

14. A computer-readable storage medium, having stored thereon a computer program product comprising instructions which, when executed on at least one processor, cause the at least one processor to carry out a method, the method comprising:
selecting a precoder based on mutual information related to channel capacity of a channel, the mutual information being computed in a closed-form computation within a set interval, selecting the precoder being further based on a mutual information gradient of a closed form computation, the mutual information gradient comprising a Gaussian-signal approximation; and transmitting data over the channel using the selected precoder.

* * * * *